(12) United States Patent
Huang et al.

(10) Patent No.: US 12,045,297 B2
(45) Date of Patent: Jul. 23, 2024

(54) DIVERSIFIED RECOMMENDATION METHOD FOR NEWS BASED ON GRAPH NEURAL NETWORK AND ITS DEVICE

(71) Applicant: Jinan University, Guangzhou (CN)

(72) Inventors: Feiran Huang, Guangzhou (CN); Yijie Zhang, Guangzhou (CN); Tingrong Zhi, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 0 days.

(21) Appl. No.: 18/490,920

(22) Filed: Oct. 20, 2023

(65) Prior Publication Data
US 2024/0184838 A1    Jun. 6, 2024

(30) Foreign Application Priority Data
Oct. 20, 2022  (CN) .......................... 202211283583.4

(51) Int. Cl.
  *G06F 16/9535*  (2019.01)
  *G06F 40/20*  (2020.01)
(52) U.S. Cl.
  CPC .......... *G06F 16/9535* (2019.01); *G06F 40/20* (2020.01)
(58) Field of Classification Search
  CPC ...... G06F 40/20; G06F 16/951; G06F 16/953; G06F 16/9532; G06F 16/9535; G06F 16/9536; G06F 16/9538
  See application file for complete search history.

(56) References Cited

U.S. PATENT DOCUMENTS

| 11,714,864 B2 * | 8/2023 | Qiu ..................... G06F 16/9535 707/754 |
| 2021/0248449 A1 * | 8/2021 | Sun ..................... G06F 16/9024 |

(Continued)

OTHER PUBLICATIONS

Feng Ke, Research on news recommendation technology and system implementation using graph neural network, China Academic Journal Electronic Publishing House, Aug. 16, 2022, pp. 1-46.

(Continued)

*Primary Examiner* — Kris E Mackes
(74) *Attorney, Agent, or Firm* — Zhigang Ma

(57) ABSTRACT

The embodiment of the invention discloses a diversified recommendation method for news based on graph neural network and its device, which comprises the followings: word segmentation processing is performed on the target news text to obtain a word segmentation set, and vectorization processing is performed on the word segmentation set, so that each word segmentation in the word segmentation set has a word segmentation embedding vector; vectorization processing is performed on a target user group, so that each user in the target user group has a user embedding vector; the word segmentation embedding vector and the user embedding vector are input into the attention mechanism algorithm to obtain the news embedding vector; a graph neural network is constructed according to the user embedding vector and the news embedding vector, and the recommendation model is trained to obtain diversified recommendation results. In the embodiment, firstly, a word segmentation tool is used to segment each news text, and then the embedding vector of news is obtained by using attention mechanism, user interest and word segmentation information, and the corresponding expression is obtained by graph neural network, and the model is optimized, and finally the diversified recommendation results are obtained by calculation.

7 Claims, 3 Drawing Sheets

(56) References Cited

U.S. PATENT DOCUMENTS

| | | | |
|---|---|---|---|
| 2022/0253688 A1* | 8/2022 | Wu | G06Q 30/0631 |
| 2022/0253722 A1* | 8/2022 | Wu | G06Q 30/0631 |
| 2023/0048742 A1* | 2/2023 | Mishra | G06V 30/19093 |
| 2023/0237261 A1* | 7/2023 | Farre Guiu | G06F 40/242 |
| | | | 704/9 |

OTHER PUBLICATIONS

CNIPA, Notification of First Office Action for CN202211283583.4, Dec. 1, 2022.

Ji'nan University (Applicant), Reply to Notification of First Office Action for CN202211283583.4, w/ replacement claims, Dec. 8, 2022.

Ji'nan University (Applicant), Supplemental Reply to Notification of First Office Action for CN202211283583.4, w/ (allowed) replacement claims, Dec. 22, 2022.

CNIPA, Notification to grant patent right for invention in CN202211283583.4, Jan. 4, 2023.

* cited by examiner

DIVERSIFIED RECOMMENDATION METHOD FOR NEWS BASED ON GRAPH NEURAL NETWORK AND ITS DEVICE

TECHNICAL FIELD

The invention relates to the technical field of computer application, in particular to a diversified recommendation method for news based on graph neural network and its device.

BACKGROUND

In recent years, with the popularity of the Internet, news plays a vital role in the whole social development process. People know what is happening around the world through the news media, and the news media is also influencing people's views on various things to some extent. It is precisely because news can guide people's views on certain things that many individuals or organizations mislead people's views on certain things by publishing false news so as to seek their own interests. At present, people usually wait for the news broadcast or actively input keywords to search for news information, so the experience effect of news recommendation is poor.

SUMMARY

In view of the defects, the embodiment of the invention discloses a diversified recommendation method for news based on graph neural network and its device, which can accurately and variously recommend.

The first aspect of the embodiment of the invention discloses a diversified recommendation method for news based on graph neural network, which comprises the following steps:
- any news text is obtained as a target news text, and word segmentation processing is performed on the target news text to obtain a word segmentation set, wherein the word segmentation set contains a plurality of word segmentation;
- vectorization processing is performed on the word segmentation set, so that each word segmentation in the word segmentation set has a corresponding word segmentation embedding vector;
- vectorization processing is performed on a target user group, so that each user in the target user group has a corresponding user embedding vector;
- the word segmentation embedding vector and the user embedding vector are input into the attention mechanism algorithm to obtain the news embedding vector;
- a graph neural network is constructed according to the user embedding vector and the news embedding vector, a recommendation model is constructed according to the graph neural network, and the recommendation model is trained to obtain diversified recommendation results.

As an alternative embodiment, in the first aspect of the embodiment of the present invention, in the step of performing word segmentation processing on the news text to obtain the word segmentation set, the word segmentation is performed by presetting word segmentation tool to obtain the word segmentation set.

As an alternative embodiment, in the first aspect of the embodiment of the present invention, the target user group is the viewing user of the target news text.

As an alternative embodiment, in the first aspect of the embodiment of the present invention, the step of inputting the word segmentation embedding vector and the user embedding vector into the attention mechanism algorithm to obtain the news embedding vector comprises the followings:
- the nonlinear transformation is performed on the user embedding vector to obtain the query vector of each user;
- the attention mechanism operation is performed on the user query vector and the word segmentation embedding vector to obtain the news embedding vector.

As an alternative embodiment, in the first aspect of the embodiment of the present invention, the step of constructing graph neural network according to the user embedding vector and the news embedding vector comprises the followings:
- the graph information of user embedding vector of each node user and graph information of news embedding vector of each target news text are obtained respectively with users and target news texts as nodes of graph neural network;
- iterative processing is performed on each node to get the final graph neural network.

As an alternative embodiment, in the first aspect of the embodiment of the present invention, the step of constructing a recommendation model according to the graph neural network and training the recommendation model comprises the followings:
- the interaction possibility between users and target news is obtained through vector convolution;
- the recommendation model is trained based on the Bayesian personalized recommendation loss function, wherein the Bayesian personalized recommendation loss function includes the interaction possibility.

As an alternative embodiment, in the first aspect of the embodiment of the present invention, the obtain diversified recommendation result comprises that follows:
- an empty set is set, and the number of times is preset through iterative operation, and news texts are obtained after each iterative operation;
- the news text is classified into the empty set to form a recommendation set, so that a diversified recommendation result is obtained after the iteration, and the diversified recommendation result is a recommendation set.

In the second aspect of the embodiment of the present invention, a diversified recommendation device for news based on graph neural network is disclosed, which comprises:
- a word segmentation processing module, which is used for acquiring any news text as a target news text, and performing word segmentation processing on the target news text to obtain a word segmentation set, wherein the word segmentation set contains a plurality of words;
- the first vectorization module, which is used for performing vectorization processing on the word segmentation set, so that each word segmentation in the word segmentation set has a corresponding word segmentation embedding vector;
- the second vectorization module, which is used for performing vectorization processing on the target user group so that each user in the target user group has a corresponding user embedding vector;
- the third vectorization module, which is used for inputting the word segmentation embedding vector and the user embedding vector into an attention mechanism algorithm to obtain the news embedding vector;

and the result obtaining module, which is used for constructing the graph neural network according to the user embedding vector and the news embedding vector, constructing the recommendation model according to the graph neural network, and training the recommendation model to obtain the diversified recommendation results.

In the third aspect of the embodiment of the present invention, an electronic device is disclosed, which comprises: a memory storing executable program codes; a processor coupled to the memory; the processor calls the executable program code stored in the memory for executing the diversified recommendation method for news based on graph neural network as disclosed in the first aspect of the embodiment of the present invention.

In the fourth aspect of the embodiment of the present invention, a computer-readable storage medium is disclosed, wherein the computer-readable storage medium stores a computer program, wherein the computer program causes the computer to execute the diversified recommendation method for news based on graph neural network as disclosed in the first aspect of the embodiment of the present invention.

Compared with the current technology, the embodiment of the invention has the following beneficial effects:

In the embodiment of the invention, firstly, a word segmentation tool is used to segment each news text, and then the embedding vector of news is obtained by using attention mechanism, user interest and word segmentation information, and the corresponding expression is obtained by graph neural network, and the model is optimized, and finally the diversified recommendation results are obtained by calculation.

BRIEF DESCRIPTION OF DRAWINGS

In order to explain the technical scheme in the embodiment of the present invention more clearly, the drawings needed in the embodiment will be briefly introduced below. Obviously, the drawings in the following description are only some embodiments of the present invention. For ordinary technicians in this field, other drawings can be obtained according to these drawings without creative work.

DETAILED DESCRIPTION OF EMBODIMENTS

In the following, the technical scheme in the embodiment of the invention will be clearly and completely described with reference to the attached drawings. Obviously, the described embodiment is only a part of the embodiment of the invention, but not the whole embodiment. Based on the embodiments in the present invention, all other embodiments obtained by ordinary technicians in the field without creative labor belong to the scope of protection of the present invention.

It should be noted that the terms "first", "second", "third" and "fourth" in the description and claims of the present invention are used to distinguish different objects, not to describe a specific order. The terms "include" and "have" and any variations thereof in the embodiments of the present invention are intended to cover non-exclusive inclusion. For example, a process, method, system, product or equipment including a series of steps or units is not necessarily limited to those explicitly listed, but may include other steps or units not explicitly listed or inherent to these processes, methods, products or equipment.

The embodiment of the invention discloses the diversified recommendation method for news based on graph neural network, device, electronic device and storage medium. Firstly, a word segmentation tool is adopted to segment each news text, and then an embedding vector of news is obtained by using an attention mechanism, user interests and word segmentation information, and a corresponding expression is obtained through the graph neural network, so that a model is optimized, and finally a diversified recommendation result is calculated.

Embodiment 1

Figure 1:
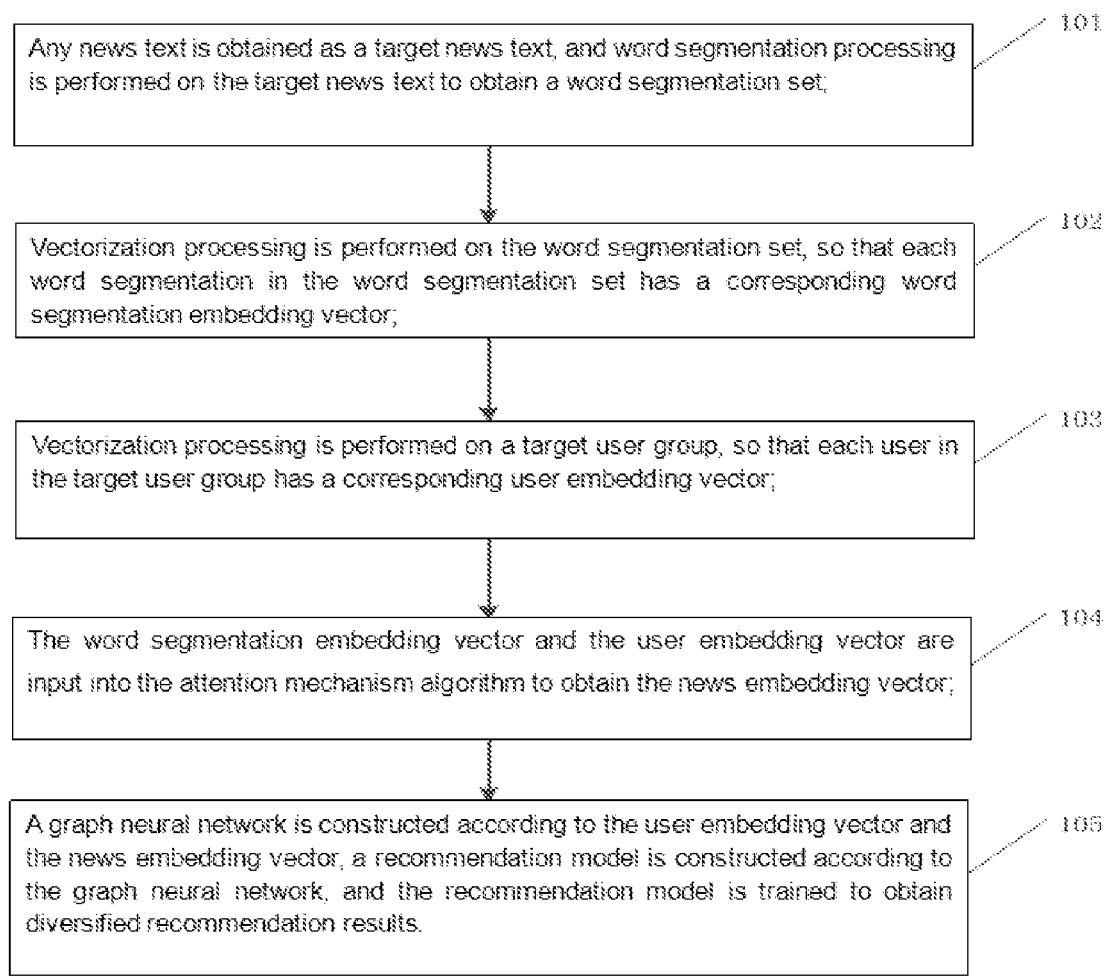
FIG. 1 is a flowchart of a diversified recommendation method for news based on graph neural network disclosed in an embodiment of the present invention.

Please refer to FIG. 1, FIG. 1 is a flowchart of a diversified recommendation method for news based on graph neural network in an embodiment of the present invention. Among them, the execution subject of the method described in the embodiment of the invention is an execution subject composed of software or/and hardware, and the execution subject can receive relevant information by wired or/and wireless means, and can send certain instructions. Of course, it can also have a certain processing function and storage function. The executing subject can control multiple devices, such as remote physical servers or cloud servers and related software, or local hosts or servers and related software that perform related operations on devices installed somewhere. In some scenarios, you can also control multiple storage devices, and the storage devices can be placed in the same place or different places with the devices. As shown in FIG. 1, the diversified recommendation method for news based on graph neural network comprises the following steps:

Step 101: any news text is obtained as a target news text, and word segmentation processing is performed on the target news text to obtain a word segmentation set, wherein the word segmentation set contains a plurality of word segmentation.

In this embodiment, more than one news text may be involved, but for each news text, the flow described in this embodiment is used for operation respectively. Firstly, from several news texts, any news text is selected as the current news text to be operated and processed, that is, the target news text, and the target news text is segmented by a word segmentation tool, and each news text has a word set. For example, the news text contains several sentences, one of which is "This is a book", which is segmented into "This is", "a" and "book". Then the word segmentation set includes three words: "This is", "a" and "book".

Step 102: vectorization processing is performed on the word segmentation set, so that each word segmentation in the word segmentation set has a corresponding word segmentation embedding vector.

In this step, the general process of natural language processing is adopted to embed vectorization to obtain the corresponding word segmentation embedding vector or word segmentation vector. The each word segmentation embedding vector $e_{c_i} \in R^{d_c}$, where $d_c$ is the embedding vector length of the word segmentation. For example, "This is a book" is segmented into "This is", "a" and "book", and the corresponding word segmentation embedding vectors are [1, 0, 0], [0, 1, 0] and [0, 0, 1].

Step 103: vectorization processing is performed on a target user group, so that each user in the target user group has a corresponding user embedding vector.

In the embodiment, the target user group is based on the current target news text, and the set of users who have watched the target news text is the target user group. For each different news text, the corresponding target user group may be different or just the same. Because the whole recommendation model still needs to consider the user information, the general process of recommendation system is adopted to perform embedding vectorization on the user to get the corresponding user embedding vector. For the corresponding user embedding vector $e_u \in R^{d_u}$ of each user, where $d_u$ is the embedding vector length of the user.

Step 104: the word segmentation embedding vector and the user embedding vector are input into the attention mechanism algorithm to obtain the news embedding vector.

Specifically, in this step, the nonlinear transformation is performed on the user embedding vector to obtain the query vector of each user, and the attention mechanism operation is performed on the user query vector and the word segmentation embedding vector to obtain the news embedding vector.

News is composed of many word sets, and each word has different contribution to news. The attention mechanism is used to assign weight to each word, and the final news embedding vector is obtained. For each target news text i, after being processed by the word segmentation tool, there is a corresponding word segmentation set $C=\{c_1, c_2, \ldots, c_P\}$, and P represents the number of word segmentation obtained after the target news text is processed by the word segmentation tool.

At the same time, for each target news text i, there is a watched user set $U_i=\{u_{i_1}, u_{i_2}, \ldots, u_{i_n}\}$, and the watched user set $U_i$ is the target user group, and then there is corresponding user embedding vector set $$E_{U_i} = \{e_{u_{i_1}}, e_{u_{i_2}}, \ldots, e_{u_{i_n}}\},$$

where n represents that n users have clicked on the news.

The news embedding vector is expressed by the interaction between the user and the news text. Specifically, a layer of nonlinear transformation is performed on the user embedding vector firstly, that is: $q_c=\sigma(Ve_u+V)$, where $V \in R^{d_c \times d_u}$, $v \in R^{d_c}$ and $\sigma$ are nonlinear functions. Then, after obtaining the query vector $q_{u_i,c}$ of each user, the attention mechanism is used to get the news embedding vector. Specifically, the attention mechanism operation is performed by the following formula:

$$a_{u_i,p} = e_{c_p}^T e_{u_i}; \alpha_{u_i,p} = \frac{\exp(a_{u_i,p})}{\sum_p \exp(a_{u_i,p})}; e_i = \text{mean}_{U_i}\left(\sum \alpha_{u_i,p} e_{c_p}\right);$$

where $e_{u_i}$ represents the embedding vector of user u who clicked on the target news text i, $e_{c_p}$ represents the embedding vector of p word segmentation in the word segmentation set, then $a_{u_i,p}$ represents the similarity between them. Finally, sum and average all users to get the news embedding vector e; corresponding to the target news text i.

Step 105: a graph neural network is constructed according to the user embedding vector and the news embedding vector, a recommendation model is constructed according to the graph neural network, and the recommendation model is trained to obtain diversified recommendation results.

In the embodiment, users and news are regarded as nodes of the graph to construct a heterogeneous graph, and recommendations are made through neural networks. The graph information of user embedding vector of each node user and graph information of news embedding vector of each target news text are obtained respectively with users and target news texts as nodes of graph neural network; iterative processing is performed on each node to get the final graph neural network. In the heterogeneous graph constructed in the embodiment, the graph neural network is used to construct the recommendation model, and the Bayesian personalized recommendation loss function is used to train the model. The interaction possibility between users and target news is obtained through vector convolution; the recommendation model is trained based on the Bayesian personalized recommendation loss function, wherein the Bayesian personalized recommendation loss function includes the interaction possibility. Firstly, there is an interaction matrix R between users and news, with the dimension of N×M, where N represents the number of users and M represents the number of news, where $R_{ij}=1$ represents that users have clicked with news, otherwise $R_{ij}=0$. For each user u and the target news text i, there is a corresponding user embedding vector $e_u$ and news embedding vector $e_u$. Here, graph neural network is used to obtain graph information for each user node, specifically:

$$e_u^{(l)} = \sum_{i \in N_u} \frac{1}{\sqrt{|N_u|}\sqrt{|N_i|}} e_i^{(l-1)};$$

where $l \in N^*$ represents the operation times of graph neural network, $N_u$ and $N_u$ represent the node neighbor sets of node u and node i, and $|\cdot|$ represents the number of set elements. The initial value of iteration is $e_u^{(0)}=e_u$. Accordingly, each news node is expressed by the following formula:

$$e_i^{(1)} = \sum_{u \in N_u} \frac{1}{\sqrt{|N_u|}\sqrt{|N_i|}} e_u^{(l-1)}.$$

The result of obtain diversity recommendation is to set an empty set, and the number of times is preset through iterative operation, and news texts are obtained after each iterative operation; the news text is classified into the empty set to form a recommendation set, so that a diversified recommendation result is obtained after the iteration, and the diversified recommendation result is a recommendation set. After training the model, the optimized user embedding vector and news embedding vector are obtained, and k recommendation results are obtained by using the maximum marginal probability algorithm, which is the final news diversity recommendation result. Specifically, for each user u, given an empty set S, the obtained user embedding vector and news embedding vector are iteratively operated for k times by the following formula, $$i = \max_{i \notin S_u}\left(\lambda \|e'_u - e'_i\|_2 + (1-\lambda)\min_j \|e'_i - e'_j\|_2\right),$$

where $e_u'$ represents the final embedding vector representation of user u, $e_i'$ and $e_j'$ respectively represent the news embedding vector with subscript i and the news embedding vector with subscript j, i is the news subscript to be selected, and j is the news subscript between sets $S_u$; every time the target news text i is obtained, it will be added to the set $S_u$ until the end of k times of iterations, and then $S_u$ is the news recommendation result with diversity for the current user u.

Embodiment 2

Figure 2:
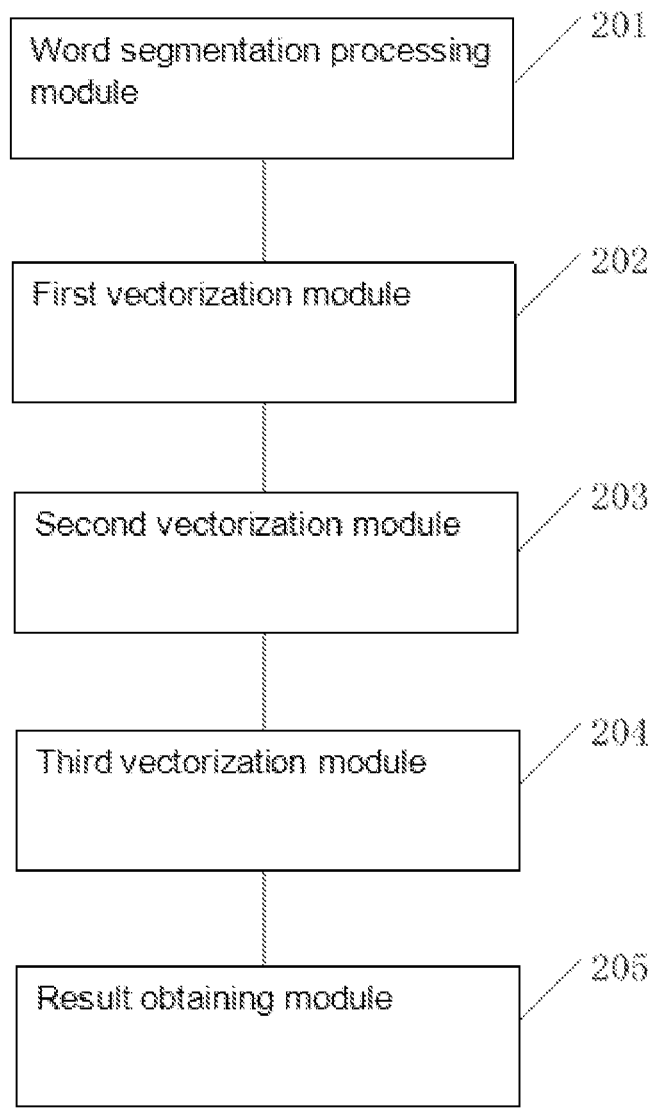
FIG. 2 is a schematic structural diagram of a diversified recommendation device for news based on graph neural network provided by an embodiment of the present invention.

Please refer to FIG. 2, FIG. 2 is a schematic structural diagram of a diversified recommendation device for news based on graph neural network disclosed in an embodiment of the present invention. As shown in FIG. 2, the diversified recommendation device for news based on graph neural network can include a word segmentation processing module 201, the first vectorization module 202, the second vectorization module 203, the third vectorization module 204 and the result obtaining module 205. Wherein, the word segmentation processing module 201, which is used for acquiring any news text as a target news text, and performing word segmentation processing on the target news text to obtain a word segmentation set, wherein the word segmentation set contains a plurality of words; the first vectorization module 202, which is used for performing vectorization processing on the word segmentation set, so that each word segmentation in the word segmentation set has a corresponding word segmentation embedding vector; the second vectorization module 203, which is used for performing vectorization processing on the target user group so that each user in the target user group has a corresponding user embedding vector; the third vectorization module 204, which is used for inputting the word segmentation embedding vector and the user embedding vector into an attention mechanism algorithm to obtain the news embedding vector; and the result obtaining module 205, which is used for constructing the graph neural network according to the user embedding vector and the news embedding vector, constructing the recommendation model according to the graph neural network, and training the recommendation model to obtain the diversified recommendation results.

In the embodiment, the word segmentation is performed by presetting word segmentation tool to obtain the word segmentation set. The target user group is the viewing user of the target news text.

In the embodiment, in the third vectorization module 204, specifically, the nonlinear transformation is performed on the user embedding vector to obtain the query vector of each user, and the attention mechanism operation is performed on the user query vector and the word segmentation embedding vector to obtain the news embedding vector. And in the result obtaining module 205, specifically, the graph information of user embedding vector of each node user and graph information of news embedding vector of each target news text are obtained respectively with users and target news texts as nodes of graph neural network; iterative processing is performed on each node to get the final graph neural network. The interaction possibility between users and target news is obtained through vector convolution; the recommendation model is trained based on the Bayesian personalized recommendation loss function, wherein the Bayesian personalized recommendation loss function includes the interaction possibility. An empty set is set, and the number of times is preset through iterative operation, and news texts are obtained after each iterative operation; the news text is classified into the empty set to form a recommendation set, so that a diversified recommendation result is obtained after the iteration, and the diversified recommendation result is the recommendation set.

The essential technical principles and technical effects of this embodiment are the same as those of Embodiment 1, so they are not described here.

Embodiment 3

Figure 3:
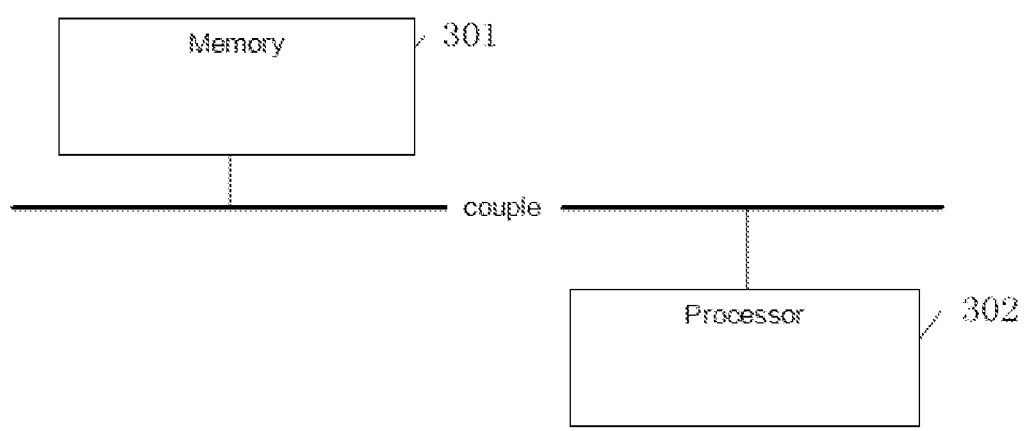
FIG. 3 is a schematic structural diagram of an electronic device provided by an embodiment of the present invention.

Please refer to FIG. 3, FIG. 3 is a schematic structural diagram of an electronic device disclosed in an embodiment of the present invention. Electronic devices can be computers, servers, etc. Of course, in some cases, they can also be smart devices such as mobile phones, tablet computers and monitoring terminals, as well as image acquisition devices with processing functions. As shown in FIG. 3, the electronic device may include:

a memory 301 storing executable program codes;

a processor 302 coupled to the memory 301;

wherein, the processor 302 calls the executable program code stored in the memory 301 for executing the part or all of the steps of the diversified recommendation method for news based on graph neural network as disclosed in the embodiment of the present invention.

In the embodiment of the present invention, a computer-readable storage medium is disclosed, wherein the computer-readable storage medium stores a computer program, wherein the computer program causes the computer to execute the part or all of the steps of the diversified recommendation method for news based on graph neural network as disclosed in the embodiment of the present invention.

In the embodiment of the present invention, a computer program product is also disclosed, wherein when the computer program product is run on a computer, the computer is caused to execute the part or all of the steps of the diversified recommendation method for news based on graph neural network as disclosed in the embodiment of the present invention.

In the embodiment of the present invention, an application publishing platform is also disclosed, wherein the application publishing platform is used for publishing a computer program product, and when the computer program product runs on a computer, the computer is caused to execute the part or all of the steps of the diversified recommendation method for news based on graph neural network as disclosed in the embodiment of the present invention.

In various embodiments of the present invention, it should be understood that the size of the serial number of each process does not mean the inevitable order of execution, and the order of execution of each process should be determined according to its function and internal logic, and should not constitute any limitation on the implementation process of the embodiment of the present invention.

The units described as separate components may or may not be physically separated, and the components displayed as units may or may not be physical units, that is, they may be located in one place or distributed to multiple network units. Some or all of the units can be selected according to actual needs to achieve the purpose of this embodiment.

In addition, each functional unit in each embodiment of the present invention may be integrated into one processing unit, or each unit may exist physically alone, or two or more units may be integrated into one unit. The integrated unit can be realized in the form of hardware or software functional unit.

If the integrated unit is realized in the form of software functional unit and sold or used as an independent product, it can be stored in a computer-accessible memory. Based on this understanding, the technical scheme of the present invention can be embodied in the form of software products in essence or in part that contributes to the current technology or in whole or in part. The computer software product is stored in a memory, and includes several requests to make a computer device (which can be a personal computer, a server or a network device, etc., specifically a processor in the computer device) perform part or all steps of the method according to various embodiments of the present invention.

In the embodiment provided by the present invention, it should be understood that "B corresponding to A" means that B is associated with A, and B can be determined according to A. However, it should also be understood that determining B according to A does not mean determining B only according to A, but also according to A and/or other information.

Those skilled in the field can understand that some or all of the steps in various methods of the embodiment can be completed by instructing related hardware through a program, which can be stored in a computer-readable storage medium, and the storage medium includes Read-Only Memory (ROM), Random Access Memory (RAM), Programmable Read-only Memory (PROM) Erasable Programmable Read-Only Memory (EPROM), One-time Programmable Read-Only Memory (OTPROM), Electrically-Erasable Programmable Read-Only Memory (EEPROM), Compact Disc Read-Only Memory (CD-ROM), or other optical disk storage, magnetic disk storage, magnetic tape storage, or any other computer-readable medium that can be used to carry or store data.

The diversified recommendation method for news based on graph neural network, device, electronic equipment and storage medium disclosed in the embodiment of the present invention are described in detail. In this paper, the principle and implementation of the present invention are expounded by using specific examples, and the description of the above embodiments is only used to help understand the method and core idea of the present invention. At the same time, according to the idea of the present invention, there will be some changes in the specific implementation and application scope for ordinary technicians in this field. To sum up, the contents of this specification should not be understood as limiting the present invention.

What is claimed is:

1. A diversified recommendation method for news based on graph neural network, comprising the following steps:

obtaining any news text as a target news text, and performing word segmentation processing on the target news text to obtain a word segmentation set, wherein the word segmentation set contains word segmentation; wherein the word segmentation set is $C=\{c_1, c_2, \ldots, c_P\}$, and P represents a number of the word segmentation obtained after the target news text is processed by a word segmentation tool;

performing vectorization processing on the word segmentation set, so that each word segmentation in the word segmentation set has a corresponding word segmentation embedding vector; and wherein the each word segmentation embedding vector is $e_{c_i} \in R^{d_c}$, where $d_c$ is an embedding vector length of the word segmentation;

performing vectorization processing on a target user group, so that each user in the target user group has a corresponding user embedding vector; and wherein the corresponding user embedding vector of each user is $e_u$, and $e_u \in R^{d_u}$, where $d_u$ is an embedding vector length of the user;

performing a nonlinear transformation on the user embedding vector to obtain a query vector of each user, and performing an attention mechanism operation on the query vector and the word segmentation embedding vector to obtain a news embedding vector; wherein the news embedding vector is expressed by an interaction between the user and the target news text and is obtained by performing a layer of the nonlinear transformation on the user embedding vector, that is:

$q_c = \sigma(V e_u + v)$, where $q_c$ is the query vector obtained by transforming the user embedding vector $e_u$, $q_c$ is equivalent to $q_{u_i,c}$, $V e_u$ is a linear transformation of the user embedding vector $e_u$, and $V \in R^{d_c \times d_u}$, $v \in R^{d_c}$ and $\sigma$ is a nonlinear function; after obtaining the query vector $q_{u_i,c}$ of each user, the news embedding vector is obtained by performing the attention mechanism operation through the following formula:

$$a_{u_i,p} = e_{c_p}^T e_{u_i}; \alpha_{u_i,p} = \frac{\exp(a_{u_i,p})}{\sum_p \exp(a_{u_i,p})}; e_i = \text{mean}_{U_i}\left(\sum \alpha_{u_i,p} e_{c_p}\right)$$

where $e_{u_i}$ represents a user embedding vector of a user u who clicked on the target news text i, $e_{c_p}$ represents a word segmentation embedding vector of p word segmentation in the word segmentation set, then $a_{u_i,p}$ represents a similarity between the $e_{u_i}$ and the $e_{c_p}$, and $e_i$ represents the news embedding vector of the target news text i;

constructing a graph neural network according to the user embedding vector and the news embedding vector, constructing a recommendation model according to the graph neural network, obtaining an interaction possibility between the target user group and the target news text by convolving the user embedding vector and the news embedding vector, training the recommendation model by a Bayesian personalized recommendation loss function including the interaction possibility to obtain an optimized user embedding vector and an optimized news embedding vector are obtained, setting an empty set $S_u$ for the user u, and obtaining diversity recommendation results by iterative operation for k times through the following formula:

$$i = \max_{i \notin S_u}\left(\lambda \|e'_u - e'_i\|_2 + (1-\lambda)\min_j \|e'_i - e'_j\|_2\right),$$

where $e_u'$ represents an embedding vector representation of the user u, $e_i'$ and $e_j'$ respectively represent a news embedding vector with a subscript i and a news embedding vector with a subscript j, i is news subscript to be selected, and j is news subscript in the set $S_u$;

adding the target news text i obtained every time of the k times of the iterative operation to the $S_u$ until the end of k times of the iterative operation to obtain a recommendation set, and then obtaining the diversity recommendation results corresponding to the user u according to the recommendation sets.

2. The diversified recommendation method for news as claimed in claim 1, wherein the target user group is viewing users of the target news text.

3. The diversified recommendation method for news as claimed in claim 1, wherein the step of constructing a graph neural network according to the user embedding vector and the news embedding vector comprises the following steps:
   obtaining graph information of the user embedding vector of the user u in each node and graph information of the news embedding vector of the target news text respectively by determining the target user group and the target news text i as nodes of the graph neural network;
   performing the iterative operation on each node to get the graph neural network.

4. The diversified recommendation method for news as claimed in claim 3, wherein the step of constructing a recommendation model according to the graph neural network and training the recommendation model comprises the following steps:
   obtaining the interaction possibility between the target user group and the target news text i through vector convolution;
   training the recommendation model based on the Bayesian personalized recommendation loss function, wherein the Bayesian personalized recommendation loss function includes the interaction possibility.

5. The diversified recommendation method for news as claimed in claim 4, wherein the obtaining diversity recommendation results comprises the following steps:
   setting the empty set $S_u$, and presetting a number of times of the iterative operation, and obtaining the target news text i after each iterative operation;
   classifying the target news text i into the $S_u$ to form the recommendation set, so that the recommendation results are obtained after the preset number of times of the iterative operation, and wherein the diversity recommendation results are the recommendation set.

6. An electronic device, wherein the electronic device comprises: a memory storing executable program codes; a processor coupled to the memory; the processor calls the executable program code stored in the memory for executing the diversified recommendation method for news based on graph neural network as claimed in claim 1.

7. A diversified recommendation method for news based on graph neural network, comprising the following steps:
   step 101, obtaining a target news text, and performing word segmentation processing on the target news text to obtain a word segmentation set $C=\{c_1, c_2, \ldots, c_P\}$; wherein the word segmentation set C comprises: word segmentation $c_1, c_2, \ldots, c_P$, and P represents a number of the word segmentation in the word segmentation set C;
   step 102, performing vectorization processing on the word segmentation set C to obtain a word segmentation embedding vector $e_{c_i}$ corresponding to each word segmentation in the word segmentation set C; wherein $e_{c_i} \in R^{d_c}$, and $d_c$ represents a length of the word segmentation embedding vector $e_{c_i}$ corresponding to the word segmentation in the word segmentation set C;
   step 103, performing vectorization processing on a target user group comprising a plurality of users to obtain a user embedding vector $e_u$ corresponding to each of the plurality of users in the target user group; wherein $e_u \in R^{d_u}$, and $d_u$ represents a length of the user embedding vector $e_u$ corresponding to the user in the target user group;
   step 104, performing a nonlinear transformation on the user embedding vector $e_u$ corresponding to each of the plurality of users to obtain a query vector $q_c$ corresponding to each of the plurality of users; performing an attention mechanism operation on the query vector $q_c$ corresponding to each of the plurality of users in the target user group and the word segmentation embedding vector $e_{c_i}$ to obtain a news embedding vector $e_i$ of the target news text i; and
   step 105, constructing a graph neural network according to the user embedding vector $e_u$ and the news embedding vector $e_i$ of the target news text i, constructing a recommendation model according to the graph neural network, and training the recommendation model by using a Bayesian personalized recommendation loss function comprising an interaction possibility to obtain diversity recommendation results; wherein the interaction possibility is obtained between the target user group and the target news text i;
   wherein the step 104 specifically comprises the following steps:
   performing the nonlinear transformation on the user embedding vector $e_u$ to obtain the query vector $q_c$ according to the following formula:

$q_c = \sigma(Ve_u + v)$ wherein $Ve_u$ represents performing a linear transformation on the user embedding vector $e_u$, $V \in R^{d_c \times d_u}$ and $v \in R^{d_c}$, and $\sigma$ represents the nonlinear transformation;
   after obtaining the query vector $q_c$, performing the attention mechanism operation on the query vector $q_c$ and the word segmentation embedding vector $e_{c_i}$ to obtain the news embedding vector $e_i$ according to the following formula:

$$a_{u_i,p} = e_{c_p}^T e_{u_i}$$

$$\alpha_{u_i,p} = \frac{\exp(a_{u_i,p})}{\sum_p \exp(a_{u_i,p})}$$

$$e_i = \text{mean}_{U_i}\left(\sum \alpha_{u_i,p} e_{c_p}\right)$$

wherein $e_{u_i}$ represents a user embedding vector of a user u who clicks on the target news text i in the target user group, $e_{c_p}$ represents a word segmentation embedding vector of a p-th word segmentation in the word segmentation set C, $a_{u_i,p}$ represents a similarity between the $e_{u_i}$ and the $e_{c_p}$; and
   wherein the step 105 specially comprises the following steps:
   determining the target user group and the target news text i as nodes of the graph neural network, obtaining graph information of the user embedding vector $e_{u_i}$ of the user u in the target user group and graph information of the news embedding vector $e_i$ of the target news text i in each of the nodes;
   performing iterative processing on each of the nodes to obtain the graph neural network;
   obtaining the interaction possibility between the target user group and the target news text i through vector convolution, and training the recommendation model based on the Bayesian personalized recommendation loss function comprising the interaction possibility;

setting an empty set $S_u$ for the user u in the target user group, presetting a number of times of iterative operation, obtaining the diversity recommendation results by the preset number of times of the iterative operation through the following formula:

$$i = \max_{i \notin S_u}\left(\lambda\|e'_u - e'_i\|_2 + (1-\lambda)\min_j\|e'_i - e'_j\|_2\right)$$

wherein $e_u'$ is an embedding vector representation of the user u, $e_i'$ and $e_j'$ represent a news embedding vector with a subscript i and a news embedding vector with a subscript j respectively, i represents a to-be-selected news subscript, and j represents a news subscript in the empty set $S_u$; and adding the target news text i obtained every time of the preset number of times of the iterative operation into the $S_u$ until the end of the preset number of times of the iterative operation, classifying the target news text i to form a recommendation set, and then obtaining the diversity recommendation results corresponding to the user u according to the recommendation set.

* * * * *